United States Patent
Sylvan et al.

(10) Patent No.: US 9,313,481 B2
(45) Date of Patent: Apr. 12, 2016

(54) STEREOSCOPIC DISPLAY RESPONSIVE TO FOCAL-POINT SHIFT

(71) Applicant: MICROSOFT TECHNOLOGY LICENSING, LLC, Redmond, WA (US)

(72) Inventors: Roger Sebastian Sylvan, Seattle, WA (US); Arthur Tomlin, Kirkland, WA (US); Daniel Joseph McCulloch, Kirkland, WA (US); Brian Mount, Seattle, WA (US); Tony Ambrus, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 147 days.

(21) Appl. No.: 14/184,482

(22) Filed: Feb. 19, 2014

(65) Prior Publication Data
US 2015/0237336 A1    Aug. 20, 2015

(51) Int. Cl.
| | |
|---|---|
| *H04N 13/04* | (2006.01) |
| *G02B 27/22* | (2006.01) |
| *G06F 3/01* | (2006.01) |
| *G02B 27/01* | (2006.01) |
| *G02B 27/00* | (2006.01) |

(52) U.S. Cl.
CPC ........ *H04N 13/0429* (2013.01); *G02B 27/0093* (2013.01); *G02B 27/017* (2013.01); *G02B 27/2228* (2013.01); *G06F 3/013* (2013.01); *H04N 13/0445* (2013.01); *H04N 13/0472* (2013.01); *H04N 13/0484* (2013.01); *G02B 2027/0181* (2013.01); *G02B 2027/0185* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 8,477,425 | B2 | 7/2013 | Border et al. |
| 2011/0075257 | A1 | 3/2011 | Hua et al. |

(Continued)

FOREIGN PATENT DOCUMENTS

| | | |
|---|---|---|
| WO | 2013040683 A1 | 3/2013 |
| WO | 2013068882 A2 | 5/2013 |

OTHER PUBLICATIONS

Wang, R. et al., "Online Gaze Disparity via Binocular Eye Tracking on Stereoscopic Displays", In Second International Conference on 3D Imaging, Modeling, Processing, Visualization and Transmission, Oct. 2012, 8 pages.

ISA European Patent Office, International Search Report and Written Opinion issued in Application No. PCT/US2015/015726, Jun. 5, 2015, Netherlands, 12 Pages.

(Continued)

*Primary Examiner* — Dave Czekaj
*Assistant Examiner* — Nam Pham
(74) *Attorney, Agent, or Firm* — Dan Choi; Judy Yee; Micky Minhas

(57) ABSTRACT

A method for displaying virtual imagery on a stereoscopic display system having a display matrix. The virtual imagery presents a surface of individually renderable loci viewable to an eye of the user. The method includes, for each locus of the viewable surface, illuminating a pixel of the display matrix. The illuminated pixel is chosen based on a pupil position of the eye as determined by the stereoscopic display system. For each locus of the viewable surface, a virtual image of the illuminated pixel is formed in a plane in front of the eye. The virtual image is positioned on a straight line passing through the locus, the plane, and the pupil position. In this manner, the virtual image tracks change in the user's pupil position.

18 Claims, 9 Drawing Sheets

(56) References Cited

U.S. PATENT DOCUMENTS

| | | | |
|---|---|---|---|
| 2013/0050070 A1* | 2/2013 | Lewis | A61B 3/113 345/156 |
| 2013/0050642 A1 | 2/2013 | Lewis et al. | |
| 2013/0083003 A1 | 4/2013 | Perez et al. | |
| 2013/0170031 A1 | 7/2013 | Bohn et al. | |
| 2013/0194259 A1 | 8/2013 | Bennett et al. | |

OTHER PUBLICATIONS

Morimoto, Carlos Hitoshi, "Automatic Measurement of Eye Features Using Image Processing", WIM 2009, http://www.lbd.dcc.ufmg.br/colecoes/wim/2009/021.pdf, Jul. 2009, pp. 2069-2076.

IPEA European Patent Office, Written Opinion issued in Application No. PCT/US2015/015726, Feb. 2, 2016, WIPO, 7 pages.

* cited by examiner the display system. In other embodiments, some or all of the functionality here ascribed to the off-board computer system 12A may be enacted instead in microcontroller 12B, or in another on-board logic system of display system 10. Accordingly, computer system 12A may be unnecessary in some embodiments.
STEREOSCOPIC DISPLAY RESPONSIVE TO FOCAL-POINT SHIFT

BACKGROUND

In recent years, three-dimensional (3D) display technology has undergone rapid development, particularly in the consumer market. High-resolution 3D glasses and visors are now possible. Using state-of-the-art microprojection technology to project stereoscopically related images to the right and left eyes, these display systems can immerse the wearer in a convincing virtual reality. Nevertheless, certain challenges remain for 3D display systems. One challenge is to position the virtual imagery accurately with regard to depth, despite moment-to-moment changes in the wearer's focal point.

SUMMARY

One embodiment of this disclosure provides a method for displaying virtual imagery on a stereoscopic display system having a display matrix. The virtual imagery presents a surface of individually renderable loci viewable to an eye of the user. The method includes, for each locus of the viewable surface, illuminating a pixel of the display matrix. The illuminated pixel is chosen based on a pupil position of the eye as determined by the stereoscopic display system. For each locus of the viewable surface, a virtual image of the illuminated pixel is formed in a plane in front of the eye. The virtual image is positioned on a straight line passing through the locus, the plane, and the pupil position. In this manner, the virtual image tracks change in the user's pupil position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
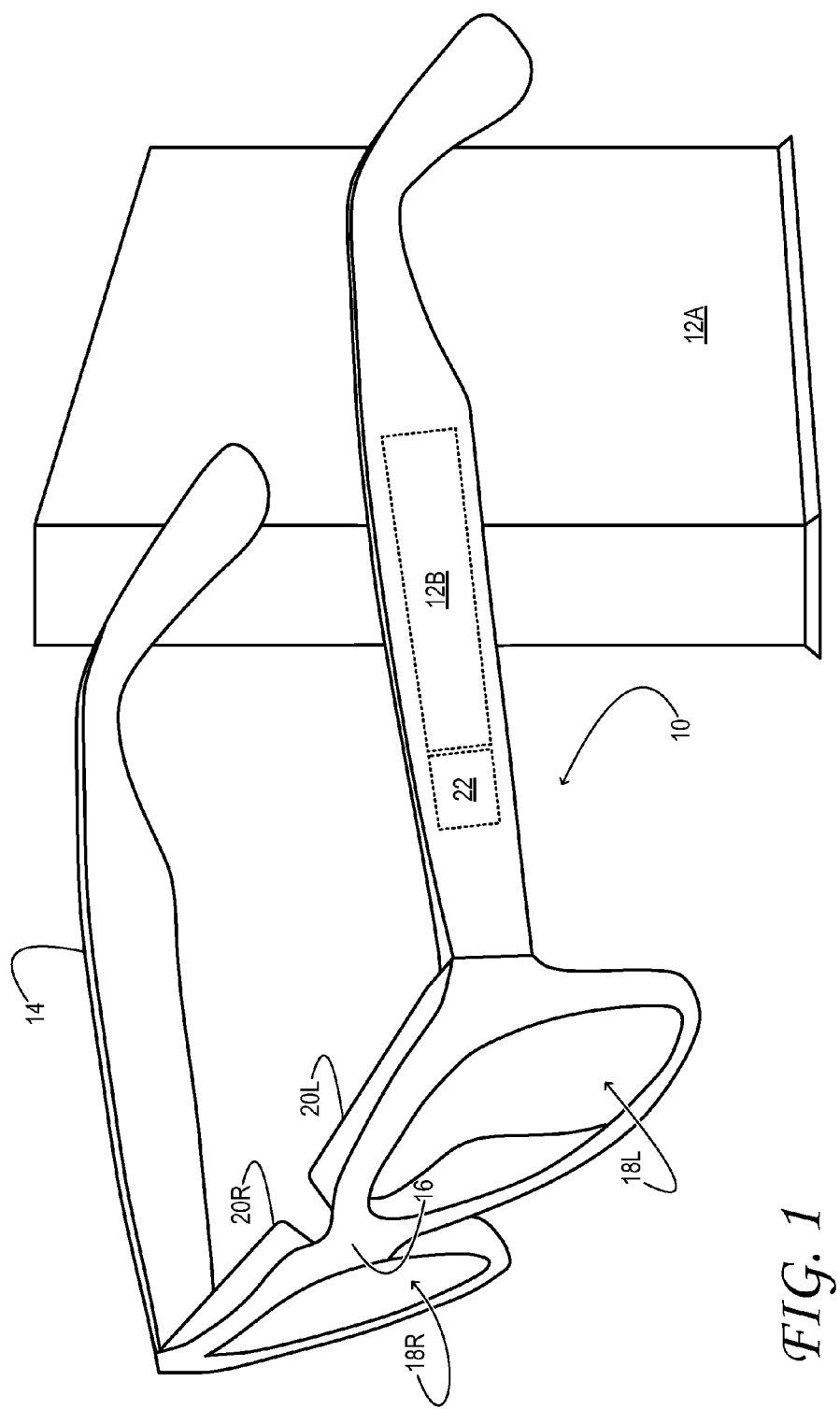
FIG. 1 shows aspects of a wearable stereoscopic display system and a computer system in one example.

Aspects of this disclosure will now be described by example and with reference to the illustrated embodiments listed above. Components, process steps, and other elements that may be substantially the same in one or more embodiments are identified coordinately and described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of a wearable stereoscopic display system 10 operatively coupled to an off-board computer system 12A. The illustrated display system resembles ordinary eyewear. It includes an ear-fitting frame 14 with a nose bridge 16 to be positioned on the wearer's face. The display system also includes a right display window 18R and a left display window 18L. In some embodiments, the right and left display windows 18 (viz., 18R and 18L) are wholly or partly transparent from the perspective of the wearer, to give the wearer a clear view of his or her surroundings. This feature enables computerized display imagery to be admixed with imagery from the surroundings, for an illusion of 'augmented reality' (AR).

In some embodiments, display imagery is transmitted in real time to display system 10 from computer system 12A. The computer system may be a game console, desktop computer, or server system, for example. In other embodiments, the computer system may be a laptop or tablet computer, smartphone, hand-held gaming device, etc. The display imagery may be transmitted in any suitable form—viz., type of transmission signal and data structure. Signal encoding the display imagery may be carried over a wired or wireless communication link of any kind to microcontroller 12B of the display system. In other embodiments, some or all of the functionality here ascribed to the off-board computer system 12A may be enacted instead in microcontroller 12B, or in another on-board logic system of display system 10. Accordingly, computer system 12A may be unnecessary in some embodiments.

Continuing in FIG. 1, microcontroller 12B is operatively coupled to right and left optical systems 20R and 20L. In the illustrated embodiment, the microcontroller is concealed within the display-system frame, along with the right and left optical systems. The microcontroller may include suitable input/output (IO) componentry to enable it to receive display imagery from computer system 12A. The microcontroller may also include position-sensing componentry 22—e.g., a global-positioning system (GPS) receiver or inertial measurement unit (IMU) to assess head orientation and/or movement, etc. When display system 10 is in operation, microcontroller 12B sends appropriate control signals to right optical system 20R which cause the right optical system to form a right display image in right display window 18R. Likewise, the microcontroller sends appropriate control signals to left optical system 20L which cause the left optical system to form a left display image in left display window 18L. The wearer of the display system views the right and left display images through the right and left eyes, respectively. When the right and left display images are composed and presented in an appropriate manner, the wearer experiences the illusion of virtual imagery—i.e., one or more virtual objects at specified positions, and having specified 3D content and other display properties. Such virtual imagery may have any desired complexity; it may, for example, comprise a complete virtual scene having both foreground and background portions.

Figure 2:
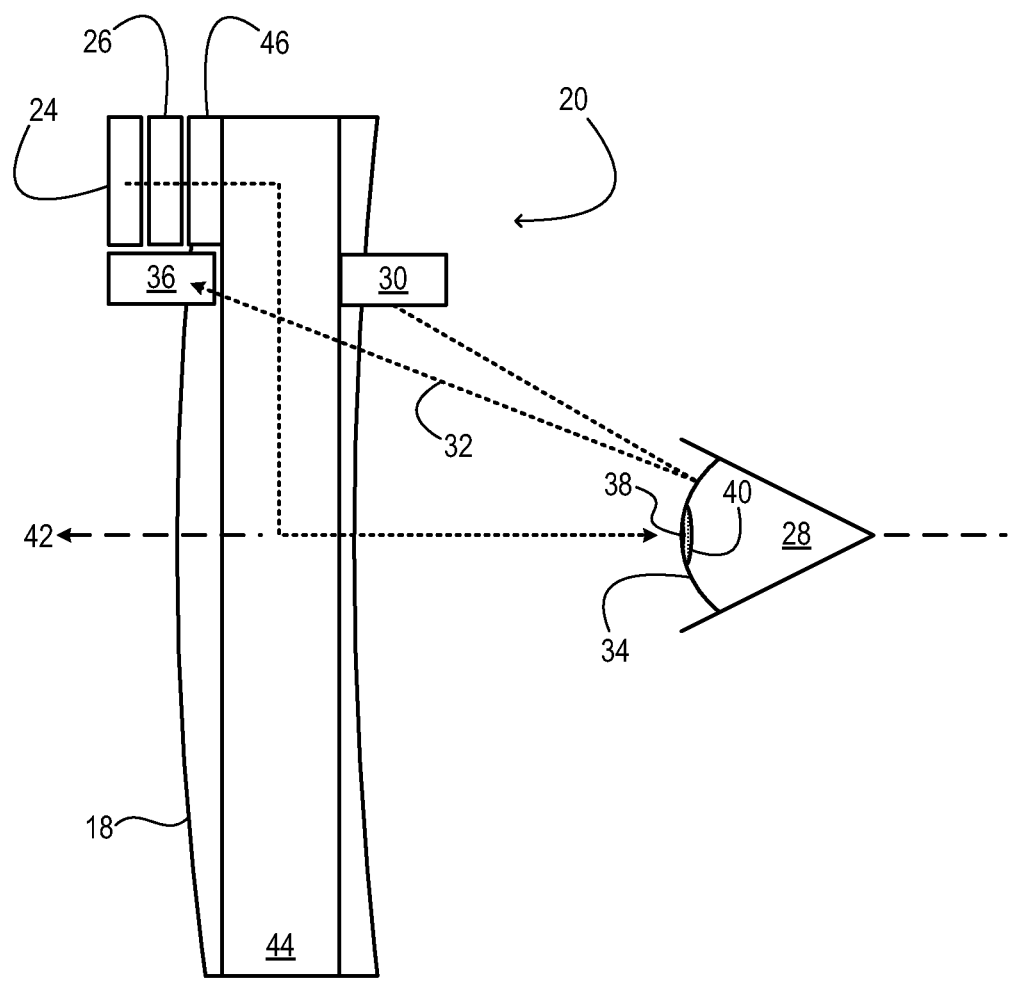
FIG. 2 shows aspects of an example right or left optical system and associated display window.

FIG. 2 shows aspects of right or left optical system 20 and an associated display window 18 in one, non-limiting embodiment. The optical system includes a backlight 24 and a liquid-crystal display (LCD) matrix 26. The backlight may include an ensemble of light-emitting diodes (LEDs)—e.g., white LEDs or a distribution of red, green, and blue LEDs. The backlight may be situated to direct its emission through the LCD matrix, which forms a display image based on control signals from microcontroller 12B. The LCD matrix may include numerous, individually addressable pixels arranged on a rectangular grid or other geometry. In some embodiments, pixels transmitting red light may be juxtaposed in the matrix to pixels transmitting green and blue light, so that the LCD matrix forms a color image. The LCD matrix may be a liquid-crystal-on-silicon (LCOS) matrix in one embodiment. In other embodiments, a digital micromirror array may be used in lieu of the LCD matrix, or an active LED matrix may be used instead. In still other embodiments, scanned-beam technology may be used to form the right and left display images. In sum, the herein-described stereoscopic rendering techniques may be used with any appropriate display technology.

Continuing in FIG. 2, optical system 20 also includes eye-tracking componentry configured to sense a pupil position of the right or left eye 28 of the wearer of display system 10. In the embodiment of FIG. 2, the eye-tracking componentry takes the form of an imaging system that images light from eye lamp 30 reflected off the wearer's eye. The eye lamp may include an infrared or near-infrared LED configured to illuminate the eye. In one embodiment, the eye lamp may provide relatively narrow-angle illumination, to create a specular glint 32 on the cornea 34 of the eye. The imaging system includes at least one camera 36 configured to image light in the emission-wavelength range of the eye lamp. This camera may be arranged and otherwise configured to capture light from the eye lamp, which is reflected from the eye. Image data from the camera is conveyed to associated logic in microcontroller 12B or in computer system 12A. There, the image data may be processed to resolve such features as pupil center 38, pupil outline 40, and/or one or more specular glints 32 from the cornea. The locations of such features in the image data may be used as input parameters in a model—e.g., a polynomial model—that relates feature position to the gaze vector 42 of the eye. The wearer's gaze vector may be used in various ways in AR applications. For example, it may be used to determine where and at what distance to display a notification or other virtual object that the wearer can resolve without changing her current focal point.

In most cases, the display image from LCD matrix 26 will not be suitable for direct viewing by the wearer of display system 10. In particular, the display image may be offset from the wearer's eye, may have an undesirable vergence, and/or a very small exit pupil (i.e., area of release of display light, not to be confused with the wearer's anatomical pupil). In view of these issues, the display image from the LCD matrix may be further conditioned en route to the wearer's eye, as further described below.

In the embodiment of FIG. 2, the display image from LCD matrix 26 is received into a vertical pupil expander 44. The vertical pupil expander lowers the display image into the wearer's field of view, and in doing so, expands the exit pupil of the display image in the 'vertical' direction. In this context, the vertical direction is the direction orthogonal to the wearer's interocular axis and to the direction that the wearer is facing. From vertical pupil expander 44, the display image is received into a horizontal pupil expander, which may be coupled into or embodied as display window 18. In other embodiments, the horizontal pupil expander may be distinct from the display window. Either way, the horizontal pupil expander expands the exit pupil of the display image in the 'horizontal' direction. The horizontal direction, in this context, is the direction parallel to the interocular axis of the wearer of display system 10—i.e., the direction in and out of the page in FIG. 2. By passing through the horizontal and vertical pupil expanders, the display image is presented over an area that substantially covers the eye. This enables the wearer to see the display image over a suitable range of horizontal and vertical offsets between the optical system and the eye. In practice, this range of offsets may reflect factors such as variability in anatomical eye position among wearers, manufacturing tolerance and material flexibility in display system 10, and imprecise positioning of the display system on the wearer's head.

In some embodiments, optical system 20 may apply optical power to the display image from LCD matrix 26, in order to adjust the vergence of the display image. Such optical power may be provided by the vertical and/or horizontal pupil expanders, or by lens 46, which couples the display image from the LCD matrix into the vertical pupil expander. If light rays emerge convergent or divergent from the LCD matrix, for example, the optical system may reverse the image vergence so that the light rays are received collimated into the wearer's eye. This tactic can be used to form a display image of a far-away virtual object. Likewise, the optical system may be configured to impart a fixed or adjustable divergence to the display image, consistent with a virtual object positioned a finite distance in front of the wearer. In some embodiments, where lens 46 is an electronically tunable lens, the vergence of the display image may be adjusted dynamically based on distance between the wearer and the virtual imagery being displayed.

Figure 3:
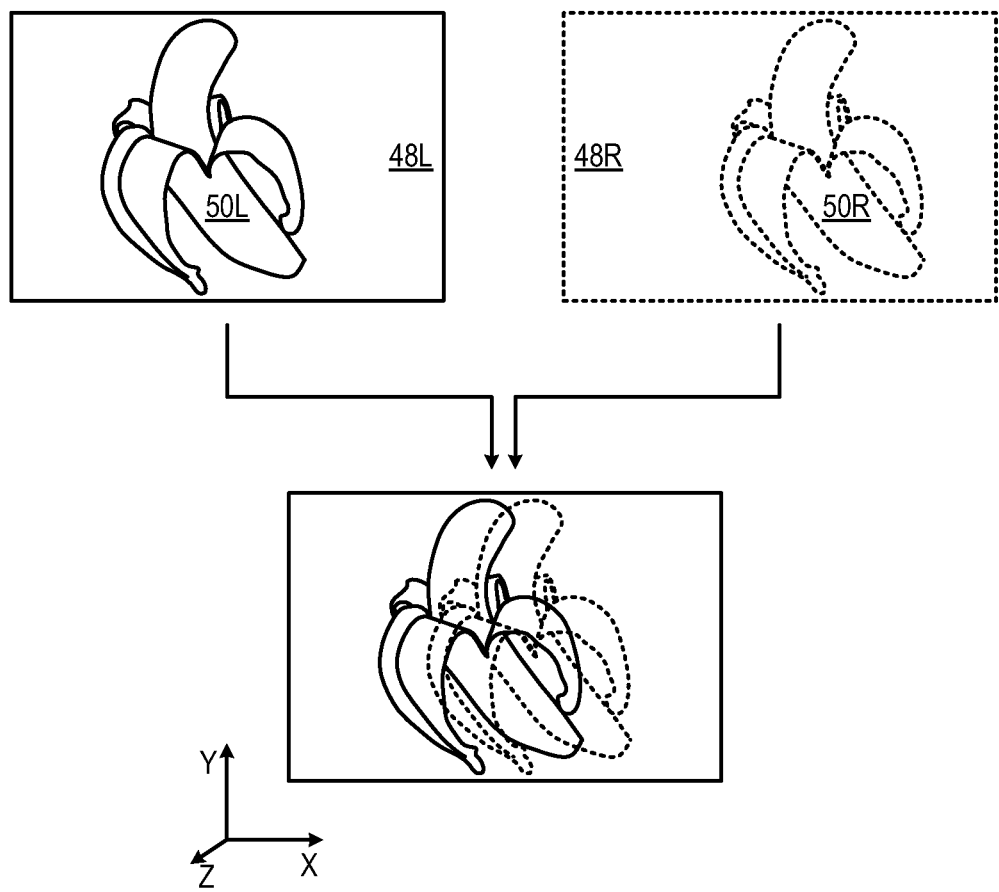
FIGS. 3 and 4 illustrate stereoscopic display of a virtual object in one example.
Figure 4:
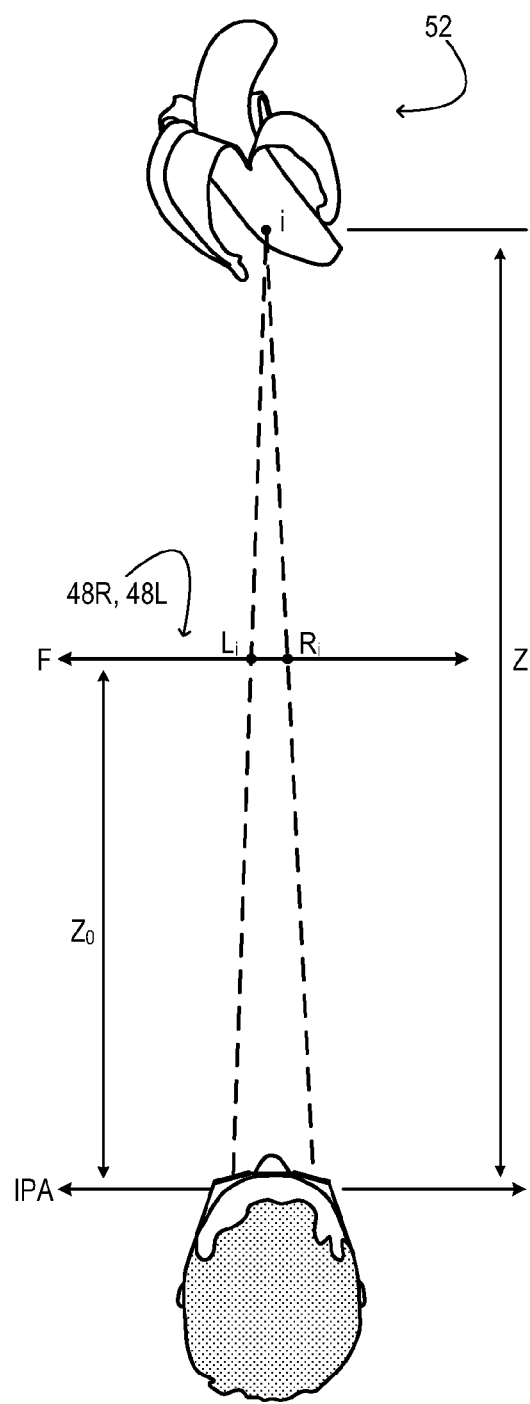

The wearer's perception of distance to virtual display imagery is affected not only by display-image vergence but also by positional disparity between the right and left display images. This principle is illustrated by way of example in FIG. 3. FIG. 3 shows right and left image frames 48R and 48L, overlaid upon each other for purposes of illustration. The right and left image frames correspond to the image-forming areas of LCD matrix 26 of the right and left optical systems, respectively. As such, the right image frame encloses right display image 50R, and the left image frame encloses left display image 50L. Rendered appropriately, the right and left display images may appear to the wearer as virtual imagery. In the example of FIG. 3, the virtual imagery presents a surface of individually renderable loci viewable to the wearer. With reference to FIG. 4, each locus i of the viewable surface has a depth coordinate $Z_i$ associated with each pixel $(X_i, Y_i)$ of the right and left display images. The desired depth coordinate may be simulated in the following manner.

At the outset, a distance $Z_0$ to a focal plane F of display system 10 is chosen. The left and right optical systems are then configured to present their respective display images at a vergence appropriate for the chosen distance. In one embodiment, $Z_0$ may be set to 'infinity', so that each optical system presents a display image in the form of collimated light rays. In another embodiment, $Z_0$ may be set to two meters, requiring each optical system to present the display image in the form of diverging light. In some embodiments, $Z_0$ may be chosen at design time and remain unchanged for all virtual imagery presented by the display system. In other embodiments, the optical systems may be configured with electronically adjustable optical power, to allow $Z_0$ to vary dynamically according to the range of distances over which the virtual imagery is to be presented.

Once the distance $Z_0$ to the focal plane has been established, the depth coordinate Z for every locus i on the viewable surface may be set. This is done by adjusting the positional disparity of the two pixels corresponding to locus i in the right and left display images, relative to their respective image frames. In FIG. 4, the pixel corresponding to locus i in the right image frame is denoted $R_i$, and the corresponding pixel of the left image frame is denoted $L_i$. In FIG. 4, the positional disparity is positive—i.e., R is to the right of $L_i$ in the overlaid image frames. This causes locus i to appear behind focal plane F. If the positional disparity were negative, the locus would appear in front of the focal plane. Finally, if the right and left display images were superposed (no disparity, $R_i$ and $L_i$ coincident) then the locus would appear to lie directly on the focal plane. Without tying this disclosure to any particular theory, the positional disparity D may be related to Z, $Z_0$, and to the interpupilary distance (IPD) of the wearer by $$D = IPD \times \left(1 - \frac{Z_0}{Z}\right).$$

In the approach described above, the positional disparity sought to be introduced between corresponding pixels of the right and left display images is 'horizontal disparity'—viz., disparity parallel to the interpupilary axis of the wearer of display system 10. Horizontal disparity mimics the effect of real-object depth on the human visual system, where images of a real object received in the right and left eyes are naturally offset along the interpupilary axis.

In view of the foregoing analysis, virtual imagery of any desired complexity may be rendered in the following manner. In one embodiment, logic in computer system 12A or microcontroller 12B maintains a model of the Cartesian space in front of the wearer in a frame of reference fixed to display system 10. The wearer's pupil positions are mapped onto this space, as are the image frames 48R and 48L, which are positioned at the predetermined depth $Z_0$. (The reader is again directed to FIGS. 3 and 4.) Then, virtual imagery 52 is constructed, with each locus i of a viewable surface of the imagery having coordinates $X_i$, $Y_i$, and $Z_i$, in the common frame of reference. For each locus of the viewable surface, two line segments are constructed—a first line segment to the pupil position of the wearer's right eye and a second line segment to the pupil position of the wearer's left eye. The pixel $R_i$ of the right display image, which corresponds to locus i, is taken to be the intersection of the first line segment in right image frame 48R. Likewise, the pixel $L_i$ of the left display image is taken to be the intersection of the second line segment in left image frame 48L. This procedure automatically provides the appropriate amount of shifting and scaling to correctly render the viewable surface, placing every locus i at the required distance from the wearer.

One source of difficulty in the above procedure is that it requires an accurate estimate of the wearer's pupil positions, or at least the IPD. The pupil positions may vary, however, from one wearer to the next, and for the same wearer in different scenarios. For instance, when a person shifts focus to a real or virtual object at any finite distance, the eye muscles respond by rotating each eye about its vertical axis, to image that object onto the fovea of the eye, where visual acuity is greatest. This response changes the pupil positions and therefore presents a problem in the rendering of virtual imagery as described above. In short, the equation above demonstrates that the appropriate positional disparity between right and left images is a function of the IPD. However, the IPD can change by several millimeters depending on whether the wearer is focused on a near-by or far-away locus.

This issue can be addressed by configuring the display system to automatically track change in the wearer's pupil positions. Two modes for estimating pupil position are envisaged: a sensory mode and a predictive mode. These modes may be used separately, in different embodiments, but also may be combined in the same embodiment, for additional advantages. The sensory mode leverages eye-tracking componentry that may be present in display system 10 to aid overall placement of virtual imagery. It senses the wearer's pupil positions based on his or her gaze vectors. The predictive mode estimates pupil position by making intelligent predictions as to the wearer's gaze vectors based on the virtual imagery being displayed.

Despite the benefits of imaging directly into the pupil positions, it may not be desirable, in general, to track pupil position in real time. In the first place, it is to be expected that the wearer's eyes will make rapid shifting movements, with ocular focus shifting off the display content for brief or even prolonged periods. It may be distracting or unwelcome for the display imagery to constantly track these shifts. Further, there may be noise associated with the determination of pupil position. It could be distracting for the display imagery to shift around in response to such noise. Finally, accurate, moment-to-moment eye tracking with real-time adjustment of the display imagery may require more compute power than is available.

Figure 5:
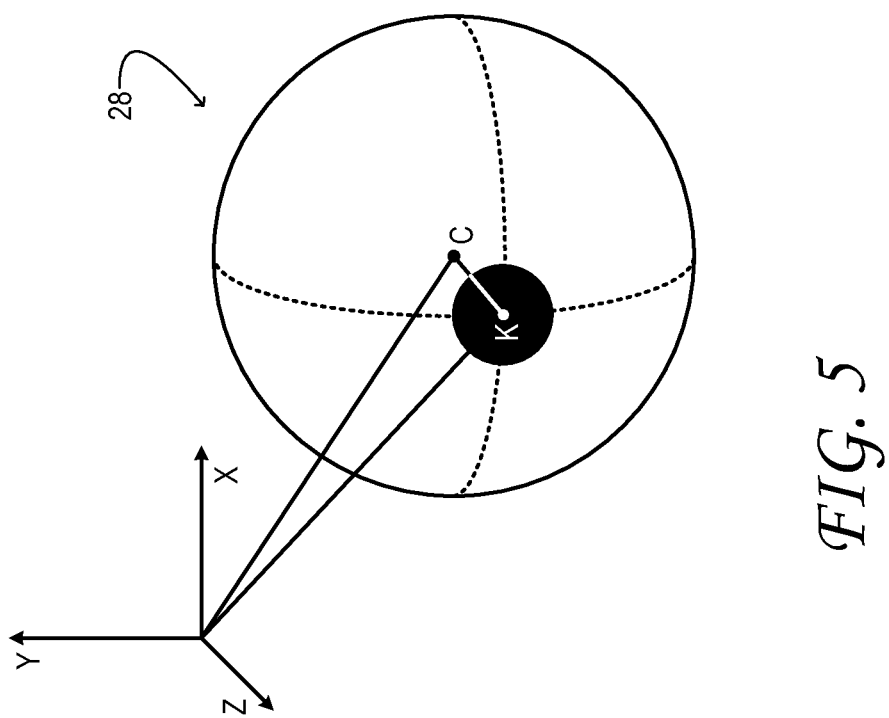
FIG. 5 shows an example pupil position and its center of rotation about the eye.

One way to address each of the above issues is to sense or predict the rotational center of the eye in lieu of the pupil position. In one embodiment, the rotational center of the eye may be determined from successive measurements of pupil position recorded over time. FIG. 5 shows aspects of this approach in one embodiment. In effect, the rotational center C can be used as a more stable, and less noisy surrogate for the pupil position K. Naturally, this approximation is most valid when the wearer is looking directly forward, so that the center of rotation is directly behind the pupil, and least valid when the wearer is looking up, down, or off to the side.

No aspect of the foregoing description or drawings should be interpreted in a limiting sense, for numerous variants lie within the spirit and scope of this disclosure. For instance, although display system 10 of FIG. 1 is a near-eye display system in which the right display image appears behind a right display window, and the left display image appears behind a left display window, the right and left display images may also be formed on the same screen. In a display system for a laptop computer, for example, or home-theatre system configured for private viewing, the right display image may be formed on a display screen using light of one polarization state, and the left display image may be formed on the same display screen using light of different polarization state. Orthogonally aligned polarization filters in the user's eyewear may be used to ensure that the each display image is received in the appropriate eye. Moreover, eye-tracking componentry is not necessary in all display-system embodiments.

The configurations described above enable various methods to display virtual imagery. Some such methods are now described, by way of example, with continued reference to the above configurations. It will be understood, however, that the methods here described, and others within the scope of this disclosure, may be enabled by different configurations as well.

Figure 6:
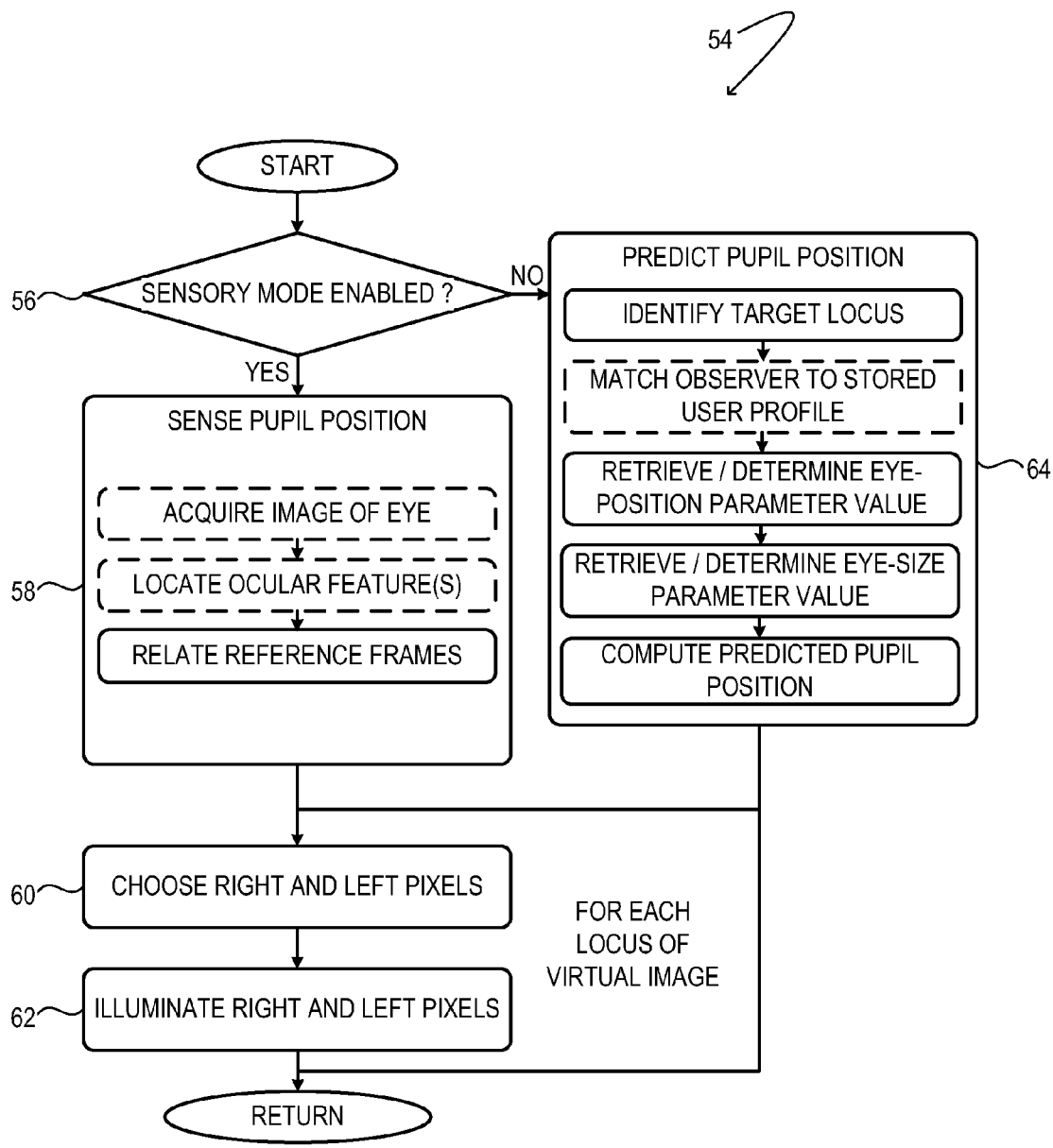
FIG. 6 illustrates an example method for displaying virtual imagery on a stereoscopic display system.

FIG. 6 illustrates an example method 54 for displaying virtual imagery on a stereoscopic display system, such as wearable display system. As noted hereinabove, the virtual imagery presents a surface of individually renderable loci viewable through the user's eyes.

At 56 of method 54, it is determined whether the sensory mode of determining pupil position in the display system is currently enabled. Naturally, this step may be omitted in configurations that lack eye-tracking componentry. Scenarios are envisaged, however, in which the sensory mode is sometimes disabled even though eye-tracking componentry is available. This could occur, for example, during power-save conditions. In some embodiments, sensory mode may be disabled pursuant to a self-diagnostic—e.g., if eye-tracking is unreliable due to an irregular eye geometry or contact lenses worn by the user. In some embodiments, sensory mode may be disabled if it is determined that the alternative, predictive mode will yield acceptable rendering accuracy. In other embodiments, sensory mode may be enabled or disabled pursuant to the distance range of the virtual imagery to be presented to the user.

If sensory mode is enabled, then the method advances to 58, where a pupil position of one or both eyes is sensed. In one embodiment, sensing the pupil position may include the acts of acquiring and analyzing an image of the right and/or left eye in eye-tracking componentry of the stereoscopic display system. To this end, specialized logic in microcontroller 12B of the display system may be configured to identify one or more ocular features in the image of the right or left eye, or in the images of both eyes. Example ocular features that may be identified include the pupil center, the pupil outline, or one or more specular glints from the cornea of the eye. Alone or in combination, such ocular features may be used to estimate the user's pupil positions in the frame of reference of the eye images. In order to use this information for display-image rendering, the frames of reference of the respective eye images are related—via a geometric transformation—to the frame of reference in which the virtual imagery is to be displayed.

At 60 of method 54, a loop is entered upon. The method loops through each locus of the viewable surface of the virtual imagery to be displayed. For each locus i, a pixel of the right display matrix is chosen for illumination. The pixel is chosen based on the coordinates $(X_i, Y_i, Z_i)$ of the locus, in addition to the pupil position of the right eye as determined by the stereoscopic display system. The pixel is chosen in view of the optical configuration of the display system—i.e., at what coordinates the image of that pixel will be formed. The display system may be configured to form an image of each pixel of the display matrix in a focal plane F in front of the user's eye. However, the chosen pixel will be one for which the virtual image so formed is positioned on a straight line passing through locus i, passing through the focal plane F, and passing through the right pupil position as determined by the display system. Again, the pupil position may be sensed or predicted, depending on whether the display system is operating in a sensory mode (described hereinabove) or in a predictive mode (described hereinafter). In like manner, for each locus of the viewable surface, a left pixel of the left display matrix is chosen for illumination. The left pixel is chosen based on the specified coordinates of locus i, in addition to the pupil position of the left eye as determined by the stereoscopic display system. Taken together, the pupil positions of the right and left eyes define the user's current IPD. As noted in the equation above, the IPD relates the depth coordinate $Z_i$ to the required horizontal disparity between corresponding right and left pixel images. Thus, the illustrated method provides, in effect, repeated adjustment of the working IPD estimate to correct for IPD change as the user's focal point changes. The same adjustment also corrects for anatomical IPD variability among different users.

Continuing in FIG. 6, at 62 of method 54, the chosen pixels are illuminated to the desired level of brightness. In embodiments in which the display system is a color display system, the illumination of a red pixel and juxtaposed blue and green pixels of a display matrix may be adjusted together, to render the locus in the desired color as well as brightness. This process is repeated for each locus i of the viewable surface of the virtual imagery. Naturally, the terms 'looping', 'repeated', etc., do not preclude parallel processing as enacted, for example, in a modern graphics-processing unit.

If it is determined at 56 that the sensory mode is not enabled, then the method advances to 64, where the pupil position is estimated in predictive mode. The essence of the predictive mode is that the display system may, at least in some scenarios, be able to predict the focal point of the user. Based on the focal point and knowledge of the user's anatomy, the system can reconstruct the user's gaze vectors and thereby estimate both the right and left pupil positions, and the intervening IPD. In general, the user's focal point is assumed to coincide with a target locus of the virtual imagery being displayed. Accordingly, the example predictive mode in FIG. 6 starts with the identification of a target locus of the virtual imagery.

The target locus may be identified differently in the different embodiments of this disclosure. In one embodiment, the target locus may be the brightest or most prominent locus of the virtual imagery. In another embodiment, the target locus may be the nearest locus of the virtual imagery. In some scenarios, such as when the virtual imagery includes only one virtual object, the target locus may be a centroid of the virtual imagery. In more complex scenarios, the target locus may be determined based on a heuristic. For example, the target locus may be the centroid of a moving virtual object in cases where only one virtual object is moving.

In some embodiments and use scenarios, stereoscopic display system 10 may be configured as a multi-user device. As such, a plurality of user profiles may be stored in and/or accessible by microcontroller 12B. Optionally, predictive mode 64 may include the act of matching the current user of the stereoscopic display system to one of the stored user profiles. Matching may be done pursuant to direct user input via an input device of computer system 12A, via natural user input such as speech recognition, or automatically via identity-sensing componentry of stereoscopic display system. Such identity-sensing componentry may include a finger- or thumb-print sensor on the frame of the display system, or iris-matching logic used in conjunction with camera 36. After the appropriate user profile is identified, that profile may be opened to retrieve certain parameter values used to predict the pupil positions. Such parameters may include (a) an eye-position parameter relatable to the distance between the user's eyes, and (b) an eye-size parameter relatable to the size of the user's eyes, among others. In one embodiment, the eye-position parameter may be mathematically reducible to the IPD of the user when the user is focused forwardly on a distant object. The eye-size parameter may be mathematically reducible to the user's eye-ball diameter. By storing such parameters in each of a plurality of user profiles, the predicted pupil position and working IPD is made responsive to variation in eye position and/or eye dimensions among different users. In alternative embodiments, in which the stereoscopic display system is a single-user device, a single set of parameters may be stored in the microcontroller and applied to all users in common.

Figure 8:
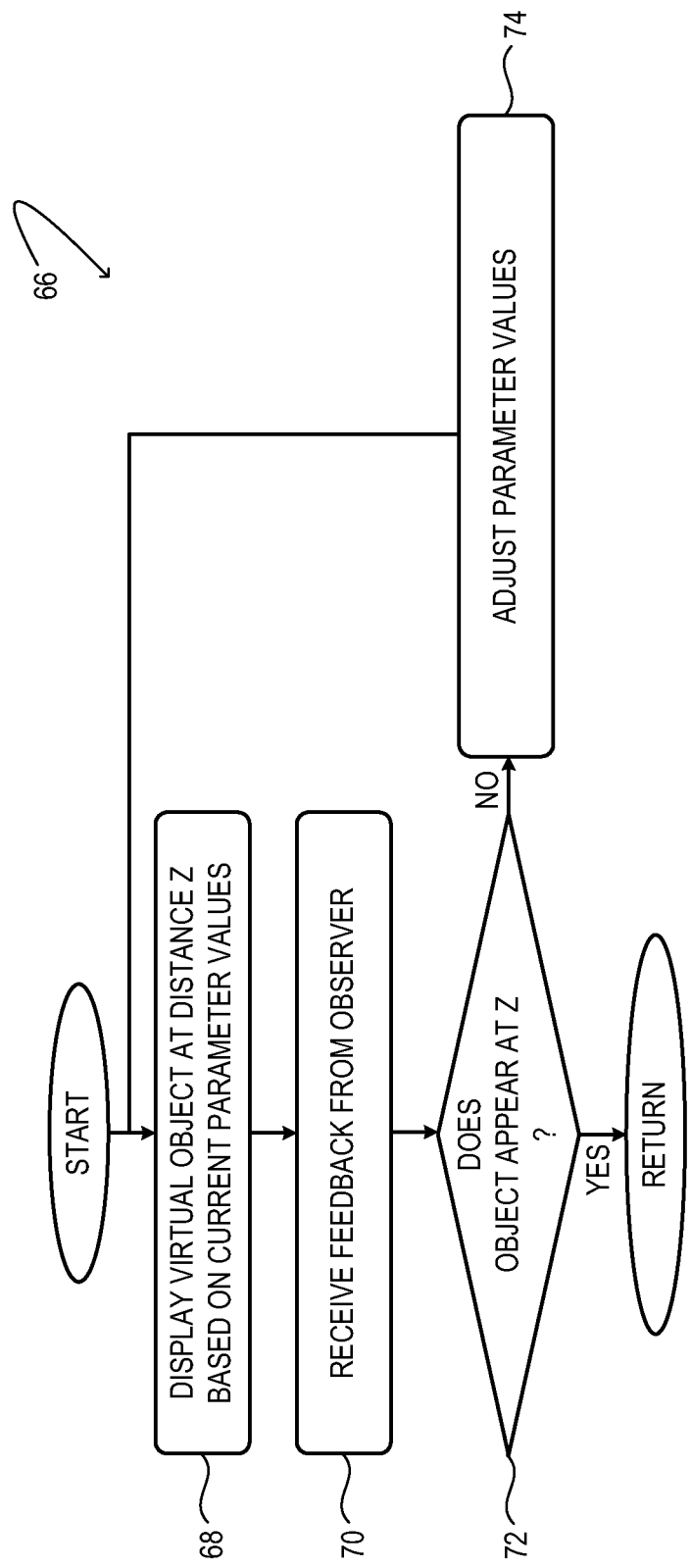
FIG. 8 illustrates an example method to determine parameter values used by the stereoscopic display system to predict the user's pupil positions.

The eye-position and eye-size parameter values may be determined and in any suitable manner, including via direct input by the user or via image data from cameras 36. In some embodiments, image data usable for this purpose may be acquired with some degree of active participation by the user. For example, during a calibration procedure for the stereoscopic display system, the user may be requested to look straight ahead at a distant object while the camera acquires images of the user's eyes. Logic in microcontroller 12B may then analyze the image data to extract the eye-position and eye-size parameter values. FIG. 8 (vide infra) illustrates another method to determine the parameter values.

Figure 7:
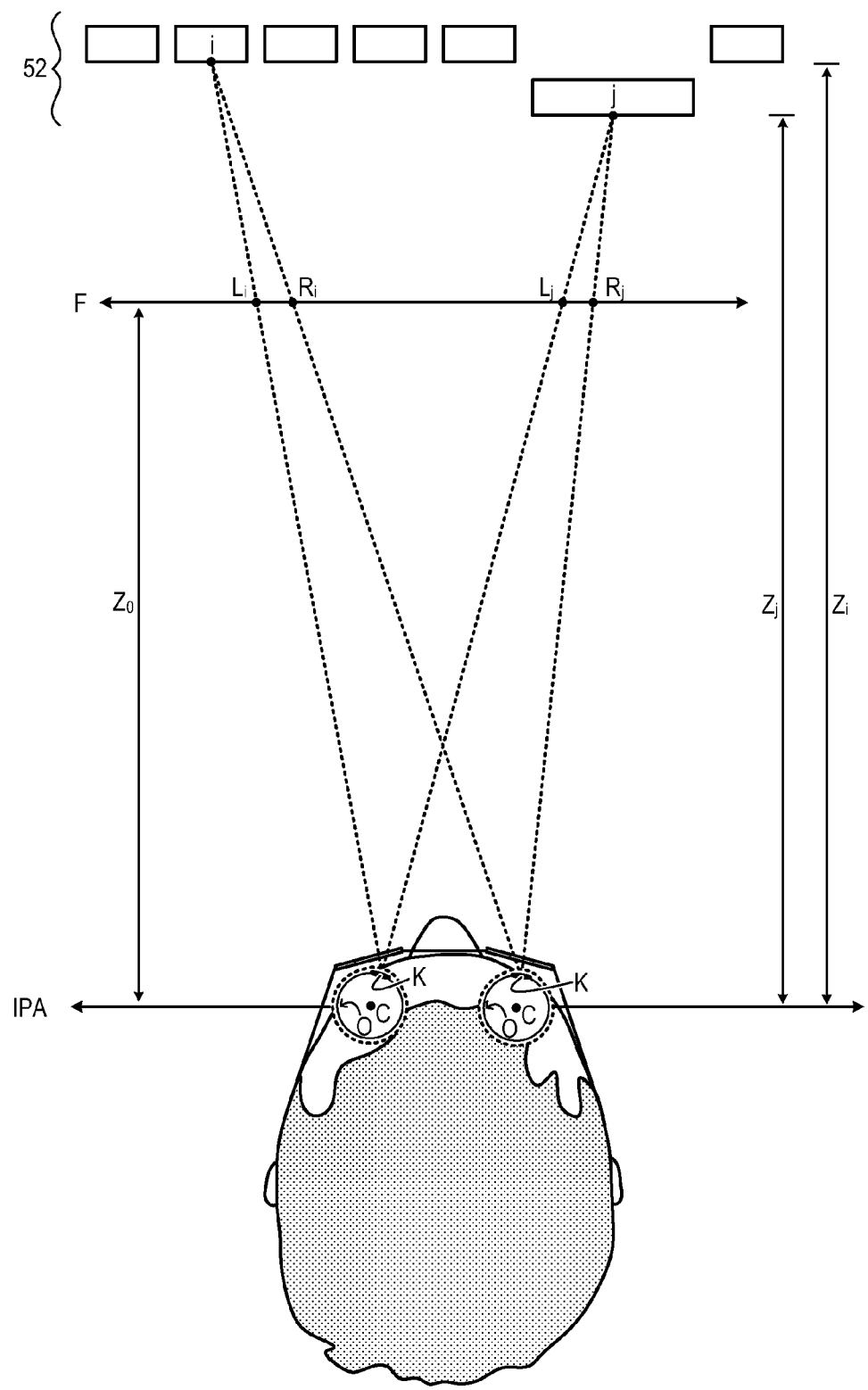
FIG. 7 shows aspects of an example geometric model for predicting the pupil positions of a wearer of a stereoscopic display system.

After the eye-position and eye-size parameter values are determined, it becomes possible to construct a geometric model akin to the model of FIG. 7. With the assumption that stereoscopic display system 10 is fit symmetrically to the wearer's face, the eye-position and eye-size parameters taken together will yield an estimate for the center positions C of the wearer's eyes, around which the pupilary orbits O may be circumscribed based on the eye-size parameter value. The central theory of the predictive mode is then applied—viz., that each pupil lies on its pupilary orbit, at a point K nearest to the predetermined target locus j of the virtual imagery. From the predicted pupil positions K, a working IPD estimate may be obtained.

FIG. 8 illustrates an example method 66 to determine one or more parameter values used by the stereoscopic display system to predict the user's pupil positions. It will be assumed that on entry to method 66, a current or default value for each of the parameters is already stored. The purpose of the method is to optimize these values for the current user, in view of his or her anatomical uniqueness.

Thus, at 68 of method 66, a preferably simple virtual object—e.g., a flat object in a vertical plane normal to the direction that the user is facing—is displayed at some distance Z, based on the parameter values currently stored. At 70 feedback is received from the user as to the position or clarity of the virtual object being displayed. The feedback is such as to indicate whether the user perceives the object to be sharp and located at Z. The user's feedback may be delivered in any suitable manner—manually, verbally, etc. Moreover, the user may be prompted to provide the feedback in any suitable manner. In one example, the virtual object displayed at 68 may be a dialog box asking "Does this box appear 2 meters away from you?". The dialog box may include response buttons labeled "Yes", "No, too far", and "No, too close," for example.

At 72 it is determined, effectively, whether the working parameter values are accurate. In particular, it is determined whether the object appears at the desired distance Z. If so, the method returns. If not, the working parameter values are adjusted, at 74, based on the feedback. For example, if the virtual object appears too far away, then the eye-position parameter value may be changed—effectively to increase the working IPD estimate. From 74, the method then returns to 68, where display of the virtual object at distance Z is attempted again. The skilled reader will understand, naturally, that numerous variants of method 66 may be used to refine the eye-position and eye-size parameter values.

As evident from the foregoing description, the methods and processes described herein may be tied to a computing system of one or more computing machines. Such methods and processes may be implemented as a computer-application program or service, an application-programming interface (API), a library, and/or other computer-program product.

Figure 9:
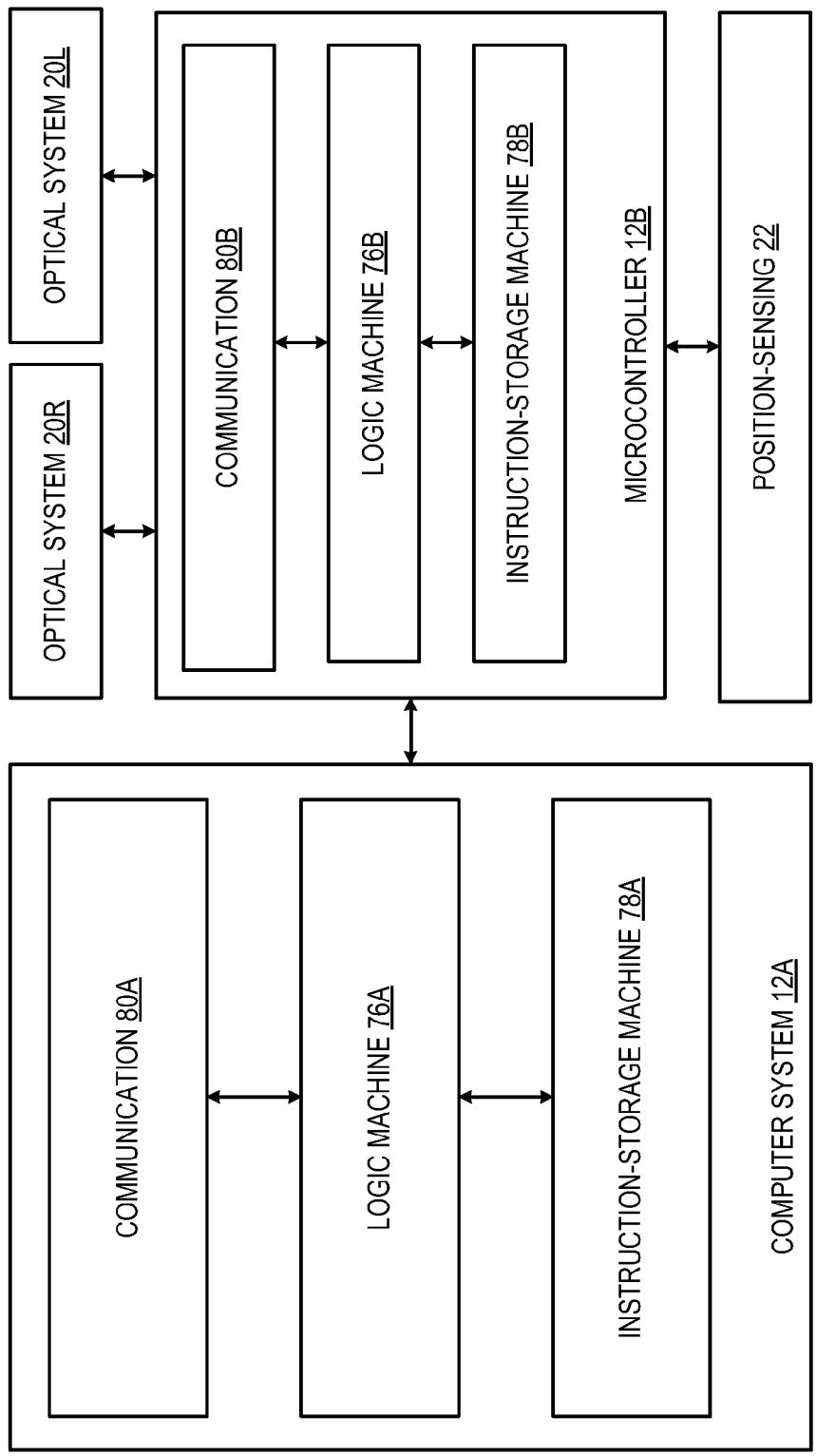
FIG. 9 shows aspects of an example computing system.

Shown in FIG. 9 in simplified form is a non-limiting example of a computing system used to support the methods and processes described herein. Each computing machine 12 in the computing system includes a logic machine 76 and an instruction-storage machine 78. The computing system also includes a display in the form of optical systems 20R and 20L, communication systems 80A and 80B, position-sensing componentry 22, and various components not shown in FIG. 9.

Each logic machine 76 includes one or more physical devices configured to execute instructions. For example, a logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Each logic machine 76 may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Each instruction-storage machine 78 includes one or more physical devices configured to hold instructions executable by an associated logic machine 76 to implement the methods and processes described herein. When such methods and processes are implemented, the state of the instruction-storage machine may be transformed—e.g., to hold different data. An instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. An instruction-storage machine may include volatile, nonvolatile, dynamic, static, read/write, read-only, random-access, sequential-access, location-addressable, file-addressable, and/or content-addressable devices.

It will be appreciated that each instruction-storage machine 78 includes one or more physical devices. However, aspects of the instructions described herein alternatively may be propagated by a communication medium (e.g., an electromagnetic signal, an optical signal, etc.) that is not held by a physical device for a finite duration.

Aspects of the logic machine(s) and instruction-storage machine(s) may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of a computing system implemented to perform a particular function. In some cases, a module, program, or engine may be instantiated via a logic machine executing instructions held by an instruction-storage machine. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

Communication system 80 may be configured to communicatively couple a computing machine with one or more other machines. The communication system may include wired and/or wireless communication devices compatible with one or more different communication protocols. As non-limiting examples, a communication system may be configured for communication via a wireless telephone network, or a wired or wireless local- or wide-area network. In some embodiments, a communication system may allow a computing machine to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for displaying virtual imagery on a stereoscopic display system having one or more display matrices the virtual imagery presenting a surface of individually renderable loci viewable to right and left eyes of a user, the method comprising:
   for each locus of the viewable surface, illuminating a right pixel of the one or more display matrices, the illuminated right pixel chosen based on a right pupil position of the right eye as determined by the stereoscopic display system;
   for each locus of the viewable surface, illuminating a left pixel of the one or more display matrices, the illuminated left pixel chosen based on a left pupil position of the left eye as determined by the stereoscopic display system;
   forming a virtual image of the right pixel in a plane in front of the right eye, the virtual image positioned on a straight line passing through the locus, the plane, and the right pupil position, and tracking change in the right pupil position; and
   forming a virtual image of the left pixel in a plane in front of the left eye, the virtual image positioned on a straight line passing through the locus, the plane, and the left pupil position, and tracking change in the left pupil position.

2. The method of claim 1, wherein the right pupil position is a sensed right pupil position, the method further comprising:
   sensing the right pupil position of the right eye by acquiring and analyzing an image of the right eye with eye-tracking componentry of the stereoscopic display system.

3. The method of claim 1, wherein the right pupil position is a predicted right pupil position, the method further comprising:
   predicting the right pupil position to be a point on the right eye lying closest to a predetermined target locus of the virtual imagery.

4. The method of claim 1, further comprising:
   predicting the right pupil position during a first operating mode of the stereoscopic display system; and
   sensing the right pupil position during a second operating mode of the stereoscopic display system.

5. A method for displaying virtual imagery on a stereoscopic display system having one or more display matrices, the virtual imagery presenting a surface of individually renderable loci viewable to right and left eyes of a user, the method comprising:
   predicting a right pupil position of the right eye to be a point on the right eye lying closest to a predetermined target locus of the virtual imagery;
   predicting a left pupil position of the left eye to be a point on the left eye lying closest to a predetermined target locus of the virtual imagery;
   for each locus of the viewable surface, illuminating a right pixel of the one or more display matrices, the illuminated right pixel chosen based on the predicted right pupil position;
   for each locus of the viewable surface, illuminating a left pixel of the one or more display matrices, the illuminated left pixel chosen based on the predicted left pupil position;
   forming a virtual image of the right pixel in a plane in front of the right eye, the virtual image positioned on a straight line passing through the locus, the plane, and the predicted right pupil position; and
   forming a virtual image of the left pixel in a plane in front of the left eye, the virtual image positioned on a straight line passing through the locus, the plane, and the predicted left pupil position.

6. The method of claim 5, further comprising identifying the target locus based on a heuristic.

7. The method of claim 5, wherein the target locus is a centroid of the virtual imagery.

8. The method of claim 5, wherein the target locus is a nearest, brightest, or most prominent locus of the virtual imagery.

9. The method of claim 5, further comprising computing the predicted right pupil position based on coordinates of the target locus and on a stored parameter value responsive to variation in right eye position among different users.

10. The method of claim 9, wherein the predicted right pupil position is computed further based on a stored parameter value responsive to variation in right eye dimensions among different users.

11. The method of claim 9, wherein the stored parameter value is determined based on feedback from the user as to position or clarity of the virtual imagery as displayed.

12. The method of claim 9, wherein the stored parameter value is mathematically reducible to an interpupilary distance of the user when the user is focused forwardly on a distant object.

13. The method of claim 9, further comprising storing the stored parameter value in one of a plurality of a user profiles of the stereoscopic display system.

14. The method of claim 13, further comprising matching the user to a corresponding user profile.

15. A method for displaying virtual imagery on a stereoscopic display system having one or more display matrices the virtual imagery presenting a surface of individually renderable loci viewable to right and left eyes of a user, the method comprising:

sensing a right pupil position of the right eye and a left pupil position of the left eye;

for each locus of the viewable surface, illuminating a right pixel of the one or more display matrices, the illuminated right pixel chosen based on the sensed right pupil position;

for each locus of the viewable surface, illuminating a left pixel of the one or more display matrices, the illuminated left pixel chosen based on the sensed left pupil position;

forming a virtual image of the right pixel in a plane in front of the right eye, the virtual image positioned on a straight line passing through the locus, the plane, and the sensed right pupil position, and tracking change in the sensed right pupil position; and forming a virtual image of the left pixel in a plane in front of the left eye, the virtual image positioned on a straight line passing through the locus, the plane, and the sensed left pupil position, and tracking change in the sensed left pupil position.

16. The method of claim 15, wherein sensing the right pupil position includes acquiring and analyzing an image of the right eye with eye-tracking componentry of the stereoscopic display system.

17. The method of claim 15, wherein the eye-tracking componentry includes:

a right-eye camera configured to acquire an image of a right eye of the user;

a left-eye camera configured to acquire an image of a left eye of the user; and logic configured to identify an ocular feature in the image of the right eye and in the image of the left eye.

18. The method of claim 17, further comprising relating the images of the right and left eyes to a frame of reference in which the virtual imagery is displayed.

* * * * *